J. L. CHURCHILL.
Reversible Magnets.

No. 135,690.

Patented Feb. 11, 1873.

Witnesses:
E. Wolff
C. Sedgwick

Inventor:
J. L. Churchill
per
Attorneys.

UNITED STATES PATENT OFFICE.

JOHN L. CHURCHILL, OF NOKOMIS, ILLINOIS.

IMPROVEMENT IN REVERSIBLE MAGNETS.

Specification forming part of Letters Patent No. 135,690, dated February 11, 1873.

*To all whom it may concern:*

Figure 1:
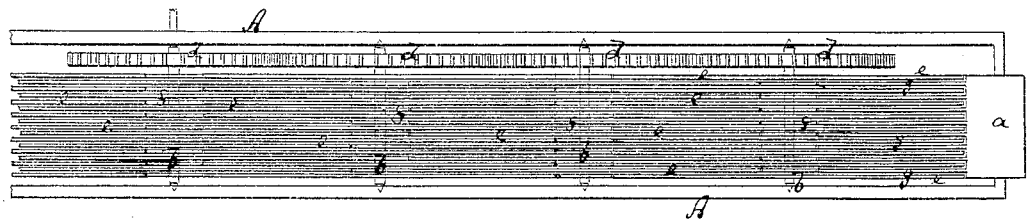
Figure 2:
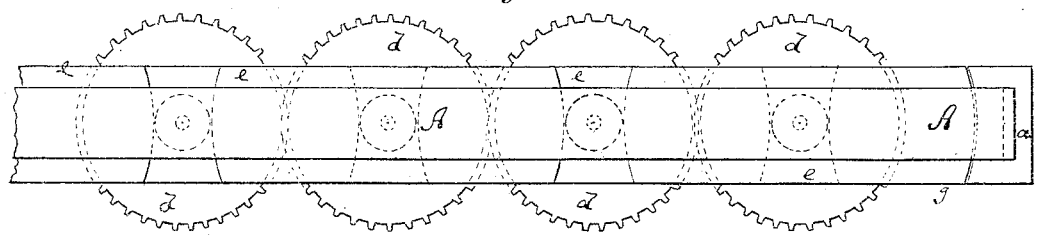
Figure 3:
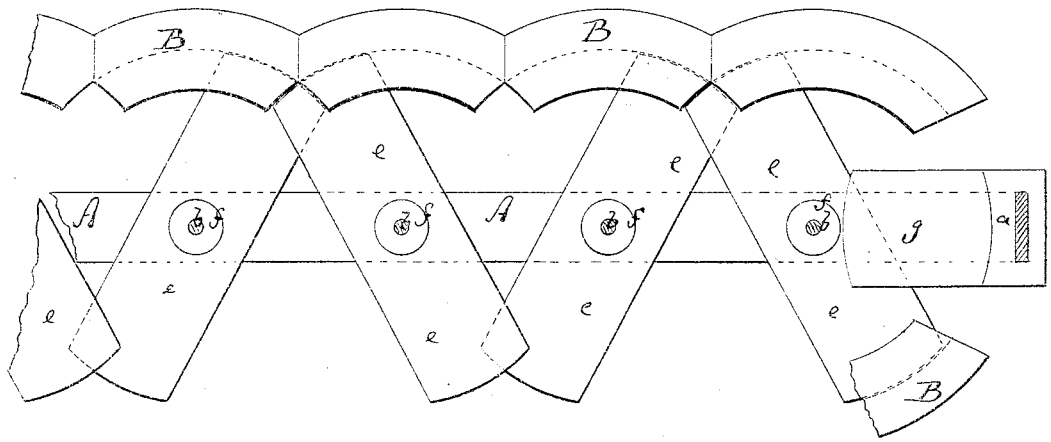

Be it known that I, JOHN L. CHURCHILL, of Nokomis, in the county of Montgomery and State of Illinois, have invented a new and Improved Reversible Magnet, of which the following is a specification:

Figure 1 is a top or edge view of my improved reversible magnet. Fig. 2 is a side or face view of the same. Fig. 3 is a detail side view of the magnets and neutralizing armature-plates.

Similar letters of reference indicate corresponding parts.

This invention relates to a new magnet of such construction that its poles can be reversed at will, to be positive or negative alternately. A magnet thus arranged will be particularly useful in electro-magnetic engines and for other purposes. The invention consists in arranging a series of rotary magnets in a rigid frame, which has soft-iron end pieces that constitute the reversible poles. The magnets are geared together, so that they will revolve simultaneously when one is turned. The invention also consists in the use of peculiar armature-plates, affixed to the side of the retaining-frame, to neutralize the mutual resistance of the magnets while they are being revolved.

In the accompanying drawing, the letter A represents one end or section of the frame in which the magnets are arranged. The ends of this frame are formed by soft-iron blocks *a* that constitute the two poles of the magnets; but one of these poles is shown in the drawing. In the frame is hung transversely a series of arbors or shafts, *b b*, which are equidistant from each other, and all geared together by gear-wheels *d d*, or otherwise. Upon these arbors is mounted a series of steel-plate magnets, *e e*, that overlap or fit between each other comb-fashion, as seen in Fig. 1; thus, if there are nine such magnets *e* on one arbor, *b*, and eight on the next, the eight fit between the nine, as shown. The lengths of the several steel-plate magnets are such that those of one arbor reach quite close to the washers *f*, mounted upon the adjoining arbors, between the magnets thereon. From each pole *a* project steel or soft-iron plate magnets or extensions *g g* toward the next arbor *b*, said extensions fitting between the magnets *e* on such next arbor. Now, if the positive poles of all the magnets *e e* are all on one side of their respective arbors and pointing toward one of the poles *a*, such pole will be positive, the other negative. When, however, all the magnets *e* are turned half around on their arbors, which motion they perform simultaneously, owing to their gear-wheel connections, the pole *a*, formerly positive, will become negative, while that which was formerly negative will become positive. Thus the entire magnet is reversed by the reversion of its lesser constituents. B B are tinned or other iron plates fastened to the sides of the frame A, and grooved to admit the ends of the steel magnets *e e*, as in Fig. 3, while they are being turned from one side to another. These plates B constitute armatures for the magnets. Their importance rests on the fact that the bar or other magnetic pole in proximity to the reversible pole at the time of reversal has an influence according to its power over a portion or all the series reversed, such that magnetic resistance may be greater than magnetic assistance to the rotation of the poles or members of the series. By the armature-plates both resistance and assistance are neutralized, or nearly so, the motion being purely mechanical. While the magnets *e* are in line with the poles *a a* the armature-plates exert no influence whatever over the same.

Connecting-rods may be used in place of the gear-wheels with substantially the same effect. The poles *a a*, instead of being immovably fixed in the frame A, may be pivoted therein to have liberty to oscillate.

Having thus described my invention, I claim as new and desire to secure by Letters Patent—

1. The frame A, containing the end poles *a a*, with the extension plates *g g*, and the arbors *b b*, with the reversible magnets *e e*, all arranged to operate substantially as herein set forth and specified.

2. The combination of the armature-plates B B with the rotary magnets *e e* in the frame A, as specified.

JOHN L. CHURCHILL.

Witnesses:
GEORGE SIPPELL,
DENNIS P. BROPHY.